(12) United States Patent
Lin et al.

(10) Patent No.: US 11,132,073 B1
(45) Date of Patent: Sep. 28, 2021

(54) STYLUS, TOUCH ELECTRONIC DEVICE, AND TOUCH SYSTEM

(71) Applicant: Acer Incorporated, New Taipei (TW)

(72) Inventors: Jia-Yu Lin, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/924,231

(22) Filed: Jul. 9, 2020

(30) Foreign Application Priority Data

Apr. 15, 2020 (TW) ................................ 109112707

(51) Int. Cl.
*G06F 3/0354* (2013.01)
*G06F 3/041* (2006.01)

(52) U.S. Cl.
CPC ........ *G06F 3/03545* (2013.01); *G06F 3/0414* (2013.01); *G06F 3/0416* (2013.01)

(58) Field of Classification Search
CPC ... G06F 3/03545; G06F 3/0414; G06F 3/0416
See application file for complete search history.

(56) References Cited

U.S. PATENT DOCUMENTS

| | | | | |
|---|---|---|---|---|
| 4,887,245 | A * | 12/1989 | Mori | G06F 3/03545 367/129 |
| 9,285,201 | B2 * | 3/2016 | Matsumiya | G01B 5/20 |
| 9,383,839 | B1 * | 7/2016 | Rost | G06F 3/03545 |
| 9,495,011 | B1 * | 11/2016 | Lee | G06F 3/03547 |
| 9,665,189 | B2 * | 5/2017 | Wang | G06F 3/0354 |
| 10,185,415 | B2 * | 1/2019 | Dekel | G06F 3/0383 |
| 10,268,273 | B1 * | 4/2019 | Sundaram | G06F 3/016 |
| 10,365,729 | B2 * | 7/2019 | Loeschinger | G06F 3/038 |
| 10,439,753 | B2 * | 10/2019 | Imanilov | H04K 1/003 |
| 10,466,816 | B2 * | 11/2019 | Watanabe | G06F 3/0446 |
| 10,725,544 | B1 * | 7/2020 | Taylor | G06F 3/038 |
| 2003/0107558 | A1 * | 6/2003 | Bryborn | G06K 9/22 345/179 |
| 2005/0189407 | A1 * | 9/2005 | Wiebe | G06K 9/22 235/375 |

(Continued)

FOREIGN PATENT DOCUMENTS

| | | |
|---|---|---|
| TW | M520677 | 4/2016 |
| TW | 201616287 | 5/2016 |

(Continued)

*Primary Examiner* — Amy Onyekaba
(74) *Attorney, Agent, or Firm* — JCIPRNET

(57) ABSTRACT

A stylus, a touch electronic device, and a touch system are provided. The touch electronic device includes a touch panel and a haptic actuation device, and the haptic actuation device is connected to the touch panel. The stylus includes a pressure sensor and a pen tip. The touch electronic device encodes transmission information into a vibration signal, determines a vibration force of the vibration signal with respect to at least one synchronization time point, and controls the haptic actuation device to drive the touch panel to output the vibration signal. The pen tip of the stylus receives the vibration signal, and the pressure sensor senses the vibration force of the vibration signal. The stylus decodes the vibration signal according to the vibration force with respect to the synchronization time point to obtain the transmission information, and the stylus performs a function according to the transmission information.

15 Claims, 5 Drawing Sheets

(56) References Cited

U.S. PATENT DOCUMENTS

| | | | |
|---|---|---|---|
| 2005/0219232 A1* | 10/2005 | Poll | G06F 3/04883 345/179 |
| 2006/0139338 A1* | 6/2006 | Robrecht | G06F 3/0488 345/175 |
| 2007/0014490 A1* | 1/2007 | Silverbrook | B41J 13/106 382/313 |
| 2007/0025805 A1* | 2/2007 | Lapstun | B43K 29/004 401/195 |
| 2007/0154116 A1* | 7/2007 | Shieh | G06F 3/03545 382/314 |
| 2007/0266582 A1* | 11/2007 | Nemoto | G01B 7/012 33/561 |
| 2007/0266781 A1* | 11/2007 | Nemoto | G01B 3/008 73/105 |
| 2009/0002345 A1* | 1/2009 | Burstrom | G06F 3/03545 345/179 |
| 2009/0135164 A1* | 5/2009 | Kyung | G06F 3/016 345/179 |
| 2010/0090815 A1* | 4/2010 | Yamaya | G06F 3/016 340/407.2 |
| 2010/0160041 A1* | 6/2010 | Grant | G06F 3/041 463/31 |
| 2010/0283766 A1* | 11/2010 | Shieh | G06K 9/00154 345/179 |
| 2011/0298709 A1* | 12/2011 | Vaganov | G06F 3/03546 345/158 |
| 2012/0098733 A1* | 4/2012 | Masuda | G06F 3/0481 345/2.2 |
| 2012/0125882 A1* | 5/2012 | Weaver | G03F 7/165 216/17 |
| 2012/0127088 A1* | 5/2012 | Pance | G06F 3/041 345/173 |
| 2012/0127114 A1* | 5/2012 | Weaver | G06F 3/03545 345/174 |
| 2013/0082830 A1* | 4/2013 | Rosen | G06F 3/016 340/407.2 |
| 2013/0271431 A1* | 10/2013 | Besperstov | G06F 3/03545 345/179 |
| 2013/0321348 A1* | 12/2013 | Takahama | G06F 3/038 345/177 |
| 2013/0321359 A1* | 12/2013 | Zeliff | G06F 3/03545 345/179 |
| 2014/0028576 A1* | 1/2014 | Shahparnia | G06F 3/04162 345/173 |
| 2014/0028592 A1* | 1/2014 | Wang | G06F 3/016 345/173 |
| 2014/0176472 A1 | 6/2014 | Lin et al. | |
| 2014/0198069 A1* | 7/2014 | Park | G06F 3/03545 345/173 |
| 2014/0245139 A1* | 8/2014 | Lee | G06F 3/04812 715/702 |
| 2014/0320462 A1* | 10/2014 | Tseng | G06F 3/03545 345/179 |
| 2014/0333553 A1* | 11/2014 | Yun | G06F 3/04162 345/173 |
| 2014/0340328 A1* | 11/2014 | Kameyama | G06F 3/03545 345/173 |
| 2015/0015489 A1* | 1/2015 | Vaganov | G06F 3/013 345/158 |
| 2015/0015549 A1* | 1/2015 | Lu | H02N 2/18 345/179 |
| 2015/0116236 A1* | 4/2015 | Kim | G06F 3/016 345/173 |
| 2015/0253879 A1* | 9/2015 | Kawai | G06F 3/04883 345/179 |
| 2015/0363012 A1* | 12/2015 | Sundara-Rajan | G06F 3/04162 345/179 |
| 2015/0371417 A1* | 12/2015 | Angelov | G06F 3/0354 345/442 |
| 2016/0154769 A1* | 6/2016 | Ikeda | G06F 3/04883 715/268 |
| 2016/0282970 A1* | 9/2016 | Evreinov | G06F 3/016 |
| 2016/0306444 A1* | 10/2016 | Fleck | G06F 13/4282 |
| 2016/0334984 A1* | 11/2016 | Ikeda | G06F 3/04883 |
| 2018/0181221 A1* | 6/2018 | Nakajima | G06F 40/171 |
| 2019/0101994 A1* | 4/2019 | Kira | G06F 3/0383 |
| 2019/0113986 A1* | 4/2019 | Bikumala | G06F 3/017 |
| 2019/0278417 A1* | 9/2019 | Kuo | G06F 3/04883 |
| 2019/0384402 A1* | 12/2019 | Huizar | G06F 3/03545 |
| 2020/0089345 A1* | 3/2020 | Fleck | G06F 3/0414 |
| 2020/0174589 A1* | 6/2020 | Hara | G06F 3/0416 |
| 2020/0319725 A1* | 10/2020 | Laslo | G06F 3/0383 |

FOREIGN PATENT DOCUMENTS

| | | |
|---|---|---|
| TW | I640904 | 11/2018 |
| TW | I658378 | 5/2019 |
| TW | M578406 | 5/2019 |
| TW | I662442 | 6/2019 |
| TW | M579768 | 6/2019 |
| TW | I671662 | 9/2019 |

\* cited by examiner

STYLUS, TOUCH ELECTRONIC DEVICE, AND TOUCH SYSTEM

CROSS-REFERENCE TO RELATED APPLICATION

This application claims the priority benefit of Taiwan patent application serial no. 109112707, filed on Apr. 15, 2020. The entirety of each of the above-mentioned patent applications is hereby incorporated by reference and made a part of this specification.

BACKGROUND

Technical Field

The disclosure relates to an electronic device, and in particular to a stylus, a touch electronic device, and a touch system.

Description of Related Art

With the development of the industry of mobile electronic devices, in order to ensure device operation to be more convenient and intuitive and make light and compact devices, touch devices acting as input and output interfaces have become the mainstream of the electronic devices. Such electronic devices equipped with the touch devices include, for instance, mobile phones, tablet computers, electronic drawing boards, notebook computers, and so on. In general, fingers and styluses are the most commonly used input tools for users to perform touch operations. Since the styluses may create fine and accurate strokes, in recent years, more and more users have been using the styluses to replace the function of handwriting input.

Recently, with the advancement of technologies and increase in market demands, the application of an active stylus has become more and more common. A tip of the active stylus emits an electric signal, and touch sensing electrodes of a touch panel receive the electric signal to detect touch positions and achieve communication transmission, which implies that the active stylus and the touch panel require a specific communication protocol for receiving and recognizing the electric signal sent by the active stylus, whereby the communication and touch input functions may be accomplished. However, the commercially available electronic devices may support different stylus communication protocols. If the communication protocol supported by the active stylus and the communication protocol supported by the electronic device are inconsistent, a user is unable to perform input operations with use of the stylus. At present, although some active styluses on the market support multiple communication protocols, the user in an attempt to switch between the communication protocols needs to manually press certain buttons, which brings inconvenience to the user.

SUMMARY

The disclosure provides a stylus, a touch electronic device, and a touch system to provide a vibration signal with transmission information through driving a touch panel by a haptic actuator, so that a stylus may obtain the transmission information from the touch electronic device according to a decoding result of the vibration signal.

An embodiment of the disclosure provides a stylus which includes a pen tip, a pressure sensor, and a controller. The pen tip is configured to receive a vibration signal, and the pressure sensor is connected to the pen tip. The pressure sensor senses a vibration force of the vibration signal. The controller is coupled to the pressure sensor. The controller decodes the vibration signal according to the vibration force with respect to the synchronization time point to obtain the transmission information and performs a function according to the transmission information. A pressure value sensed by the pressure sensor is positively correlated to the vibration force of the vibration signal.

An embodiment of the disclosure provides a touch electronic device which includes a touch panel, a haptic actuation device, a storage device, and a processor. The haptic actuation device is connected to the touch panel. The processor is coupled to the touch panel, the haptic actuation device, and the storage device. The processor encodes transmission information into a vibration signal, determines a vibration force of the vibration signal with respect to at least one synchronization time point according to the transmission information, and controls the haptic actuation device to drive the touch panel to output the vibration signal, so that a stylus obtains the transmission information through receiving the vibration signal.

An embodiment of the disclosure provides a touch system which includes a touch electronic device and a stylus. The touch electronic device includes a touch panel and a haptic actuation device, and the haptic actuation device is connected to the touch panel. The stylus includes a pressure sensor and a pen tip, and the pressure sensor is connected to the pen tip. The touch electronic device encodes transmission information into a vibration signal and controls the haptic actuation device to drive the touch panel to output the vibration signal. The pen tip of the stylus receives the vibration signal, and the pressure sensor senses a vibration force of the vibration signal. The stylus decodes the vibration signal according to the vibration force to obtain the transmission information, and the stylus performs a function according to the transmission information.

Based on the above, in one or more embodiments of the disclosure, the haptic actuation device drives the touch panel to provide the vibration signal with the transmission information, and the stylus may sense the vibration force by sensing the pressure applied to the pen tip by the vibration signal. The stylus may obtain the transmission information from the touch electronic device according to the sensed pressure corresponding to vibration force, so as to perform subsequent functions according to the transmission information. Thereby, the active stylus and the touch electronic device may perform a function of two-way communication.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Some embodiments provided in the disclosure will be described in detail with reference to the accompanying drawings. Reference numbers or symbols are used to represent elements in the following description, and the same reference numbers or symbols in different drawings represent the same or similar elements. These embodiments are only a part of the disclosure and are not all the embodiments of the disclosure. Rather, these embodiments are only examples of devices and systems within the scope of projection provided in the claims.

Figure 1:
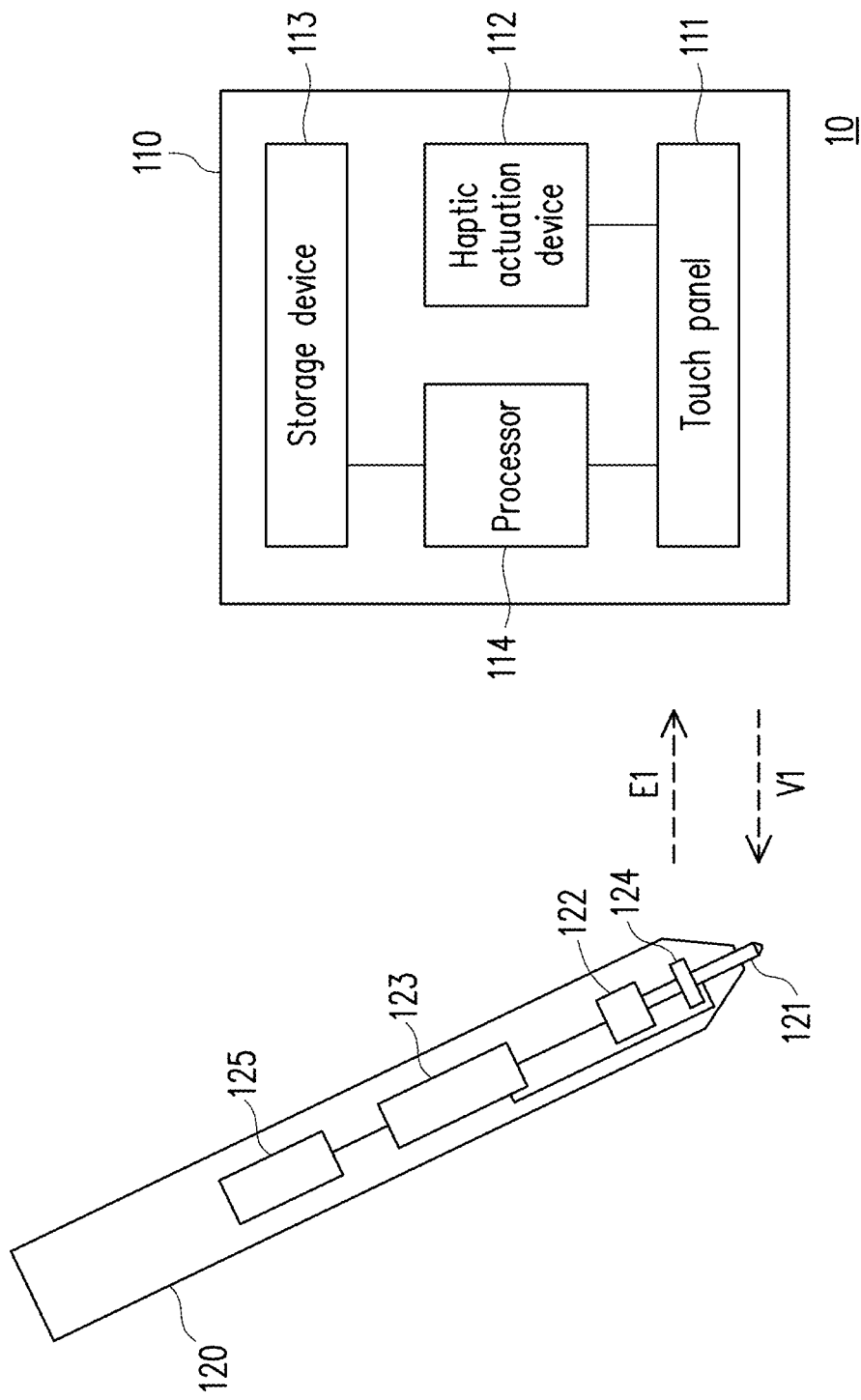
FIG. 1 is a schematic diagram of a touch system according to an embodiment of the disclosure.

FIG. 1 is a schematic diagram of a touch system according to an embodiment of the disclosure. With reference to FIG. 1, a touch system 10 includes a stylus 120 and a touch electronic device 110. The touch electronic device 110 is, for instance, an electronic device capable of performing a touch input function, such as a mobile phone, a smart phone, a tablet computer, an electronic drawing board, an e-book, a game console, and so forth, which should not be construed as a limitation in the disclosure. A user may use the stylus 120 to perform a touch input operation on the touch electronic device 110.

In an embodiment, the touch electronic device 110 includes a touch panel 111, a haptic actuation device 112, a storage device 113, and a processor 114.

The touch panel 111 has a plurality of touch sensing electrodes arranged in an array and may be a capacitive touch panel. The touch panel 111 may detect touch events applied on the touch panel 111 through the touch sensing electrodes. In addition, the touch sensing electrodes of the touch panel 111 may receive an electric signal E1 coming from the stylus 120 through electrostatic induction or electromagnetic induction. In an embodiment, the touch panel 111 and a display may be integrated to form a touch screen. In an alternative embodiment, the touch panel 111 may be a touch handwriting tablet. For instance, the user may touch the touch panel 111 of the touch electronic device 110 through the stylus 120 and slide the stylus 120 on the touch panel 111 to cooperate with application software for writing or drawing.

The haptic actuation device 112 is connected to the touch panel 111. The haptic actuation device 112 is equipped with one or more haptic actuators. In an embodiment, vibration characteristics generated by the haptic actuator are editable. The haptic actuator is, for instance, a PowerHap piezoelectric actuator, an electroactive polymer (EAP) actuator, a magnetostrictive actuator, a voice coil motor actuator, a linear-resonance actuator (LRA), an electromagnetic actuator, or any other haptic actuator, which should however not be construed as a limitation in the disclosure. In an embodiment, the haptic actuation device 112 is configured to generate a vibration and drive the touch panel 111 to output a vibration signal V1 by directly or indirectly touching the touch panel 111.

The storage device 113 is configured to store data and program codes for the processor 114 to access, such as an operating system, an application, a driver, etc., and the storage device 113 may be, for instance, any type of fixed or movable random access memory (RAM), read only memory (ROM), flash memory, or a combination thereof.

The processor 114 is coupled to the touch panel 111, the haptic actuation device 112, and the storage device 113, and the processor 114 is, for instance, a central processing unit (CPU) or any other programmable general-purpose or special-purpose microprocessor, digital signal processor (DSP), programmable controller, application specific integrated circuit (ASIC), programmable logic device (PLD), any other similar device, or a combination thereof. The processor 114 may access and execute the program codes and software recorded in the storage device 113, so as to carry out a method of communicating with the stylus 120 through the vibration signal as provided in an embodiment of the disclosure.

On the other hand, in an embodiment, the stylus 120 is an active stylus and includes a pen tip 121, a pressure sensor 122, a controller 123, a signal transmitter 124, and a storage device 125.

The pen tip 121 is made of a conductive material, and the pen tip 121 is configured to input touch events to the touch panel 111. In an embodiment, the pen tip 121 is configured to emit the electric signal E1 to the touch panel 111, so that touch sensing electrodes of the touch panel 111 may receive the electric signal E1 and detect the touch position. The pen tip 121 is configured to communicate with the touch sensing electrodes of the touch panel 111 electromagnetically or electrostatically.

The pressure sensor 122 is connected to the pen tip 121. The pressure sensor 122 is usually made of a piezoelectric material. When the pen tip 121 of the stylus 120 is in contact with the touch panel 111, the pressure sensor 122 may sense the pressure of pushing the pen tip 121 toward the inside of the pen tube. In an embodiment, when the user holds the stylus 120 and places the pen tip 121 on the touch panel 111, the pressure sensor 122 may output a corresponding voltage signal to the controller 123 in response to the pressure sensed by the pen tip 121.

The signal transmitter 124 is connected to the pen tip 121 and configured to generate the electric signal E1 transmitted to the touch electronic device 110. In an embodiment, the touch panel 111 may detect the touch position of the stylus 120 in response to the electric signal E1 generated by the signal transmitter 124. For instance, according to a capacitance sensing result of the touch sensing electrodes arranged in an array, the touch panel 111 may detect the touch position of the stylus 120 in response to the electric signal emitted by the pen tip 121. In addition, in an embodiment, the signal transmitter 124 may also transmit the electric signal E1 carrying specific data or commands to the touch electronic device 110. It should be mentioned that the stylus 120 and the touch electronic device 110 need to use the same active pen communication protocol for communication. The foregoing active pen communication protocol is, for instance, the Microsoft Pen Protocol (MPP), the Wacom AES protocol, or any other active pen communication protocol on the market, which should however not be construed as a limitation in the disclosure.

The storage device 125 is configured to store data and may be, for instance, any type of fixed or movable RAM, ROM, flash memory, or a combination thereof.

The controller 123 is coupled to the pressure sensor 122, the signal transmitter 124, and the storage device 125 to control the overall operation of the stylus 120. The related functions of the controller 123 may be implemented in various logic blocks, modules, and circuits in one or more controllers, microcontrollers, microprocessors, ASICs, DSPs, field programmable gate arrays (FPGA), and/or any other processing unit.

However, in addition to the pen tip 121, the pressure sensor 122, the controller 123, the signal transmitter 124, and the controller 123, the stylus 120 may also include elements not shown in FIG. 1, such as signal receivers, power circuits, tilt angle sensors, other communication elements, and so forth, which should however not be construed as a limitation in the disclosure.

In an embodiment, the stylus 120 may perform a two-way communication function with the touch electronic device 110 by transmitting the electric signal E1 and receiving the vibration signal V1. As described above, the stylus 120 may send the electric signal E1 through the pen tip 121, so that the touch sensing electrodes of the touch panel 111 may receive the electric signal E1. It is worth mentioning that the touch electronic device 110 may encode transmission information into the vibration signal V1, determine a vibration force of vibration signal V1 with respect to at least one synchronization time point according to the transmission information, and control the haptic actuation device 112 to drive the touch panel 111 to output the vibration signal V1. The pen tip 121 of the stylus 120 receives the vibration signal V1, and the pressure sensor 122 senses the vibration force of the vibration signal V1. The stylus 120 decodes the vibration signal V1 according to the vibration force to obtain the transmission information, and the stylus 120 may perform a function according to the transmission information.

Figure 2:
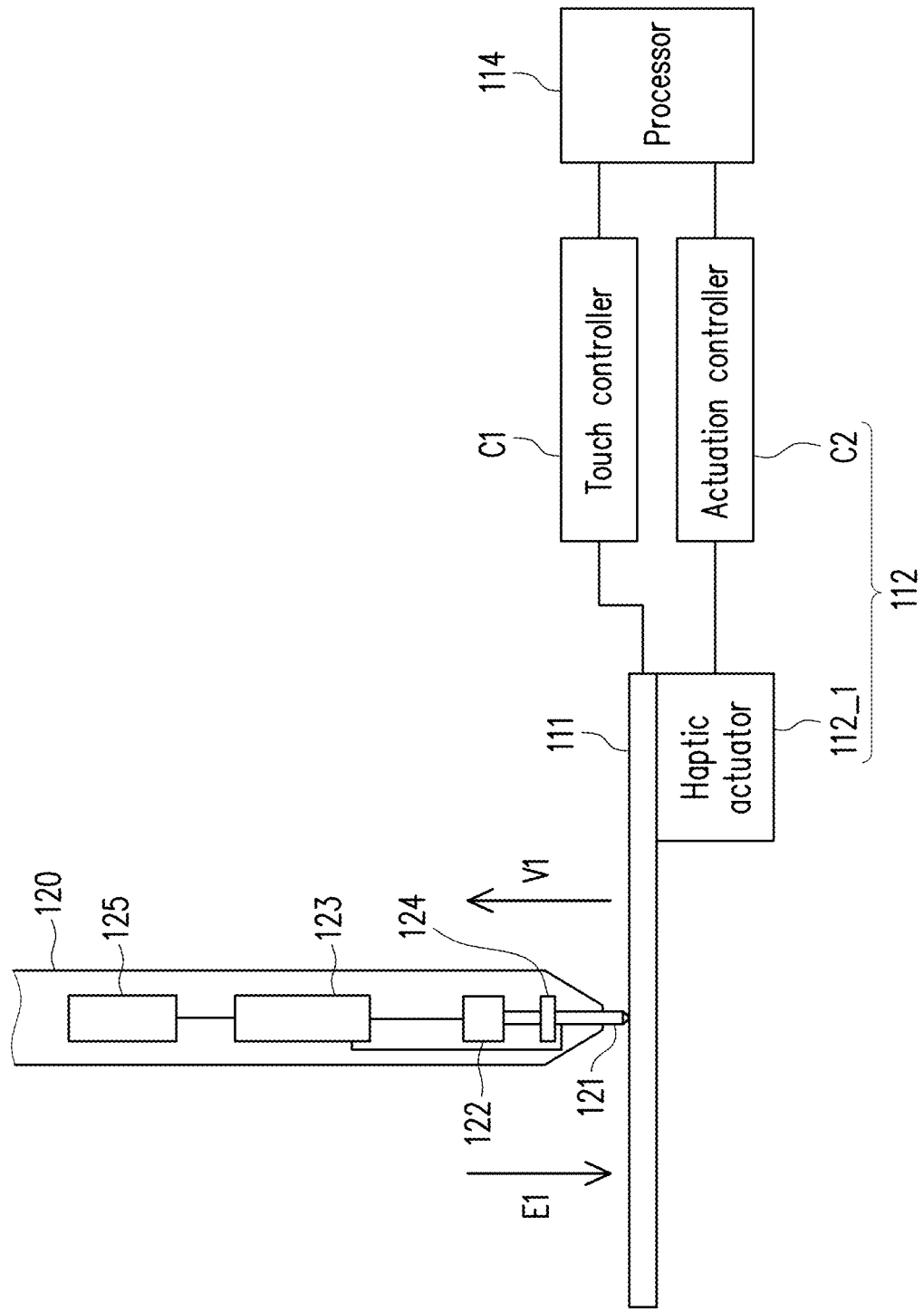
FIG. 2 is a schematic diagram of sensing a vibration signal by a stylus according to an embodiment of the disclosure.

For instance, FIG. 2 is a schematic diagram of sensing a vibration signal by a stylus according to an embodiment of the disclosure. With reference to FIG. 2, in an embodiment, a touch controller C1 is coupled between the processor 114 and the touch panel 111. In an embodiment, the touch controller C1 may be a touch integrated circuit (IC) packaged into a chip. The touch controller C1 is configured to control the overall operation of the touch panel 111. In an embodiment, the touch controller C1 may report the touch information sensed by the touch panel 111 to the operating system or application software executed by the processor 114. In an embodiment, a memory circuit in the touch controller C1 may record panel information of the touch panel 111.

In addition, the haptic actuation device 112 may include a haptic actuator 112_1 and an actuation controller C2. The haptic actuator 112_1 connected to the touch panel 111 is controlled by a driving signal sent by the actuation controller C2, and the actuation controller C2 may output the driving signal in form of a pulse width modulation (PWM) signal. The haptic actuator 112_1 may provide a vibration according to oscillation conditions required by the PWM signal. In other words, by controlling a voltage amplitude and a pulse width of the PWM signal, the vibration characteristics of the haptic actuator 112_1 may be controlled. The vibration characteristics may include the vibration force (i.e., vibration intensity) and a vibration frequency.

As shown in FIG. 2, when the processor 114 determines to provide the transmission information to the stylus 120, the processor 114 may determine the vibration force (i.e., the vibration intensity) and the vibration frequency of the vibration signal V1 according to the transmission information. The transmission information may be any command or data, which should however not be construed as a limitation in the disclosure. The different vibration forces may correspond to different commands, codes, data, or character symbols. In other words, the processor 114 may encode the transmission information according to a preset encoding rule to determine the vibration force of the vibration signal V1. Next, the processor 114 may control the haptic actuation device 112 to vibrate according to a vibration encoding result to drive the touch panel 111 to output the vibration signal V1.

Correspondingly, the pen tip 121 touching the touch panel 111 may receive the vibration signal V1 and transmit the vibration signal V1 to the pressure sensor 122. The pressure sensor 122 may sense the vibration force of the vibration signal V1. To be specific, the pressure sensor 122 may sense a pressure value applied to the pen tip 121 by the vibration signal V1, and the pressure value sensed by the pressure sensor 122 is positively correlated to the vibration force of the vibration signal V1. In other words, the greater the vibration force of the vibration signal V1, the greater the pressure value sensed by the pressure sensor 122. The smaller the vibration force of the vibration signal V1, the smaller the pressure value sensed by the pressure sensor 122. Accordingly, in response to the pressure value reported by the pressure sensor 122, the controller 123 may learn the vibration force of the vibration signal V1 and decode the vibration signal V1 according to the vibration force with respect to the synchronization time point to obtain the transmission information.

Figure 3:
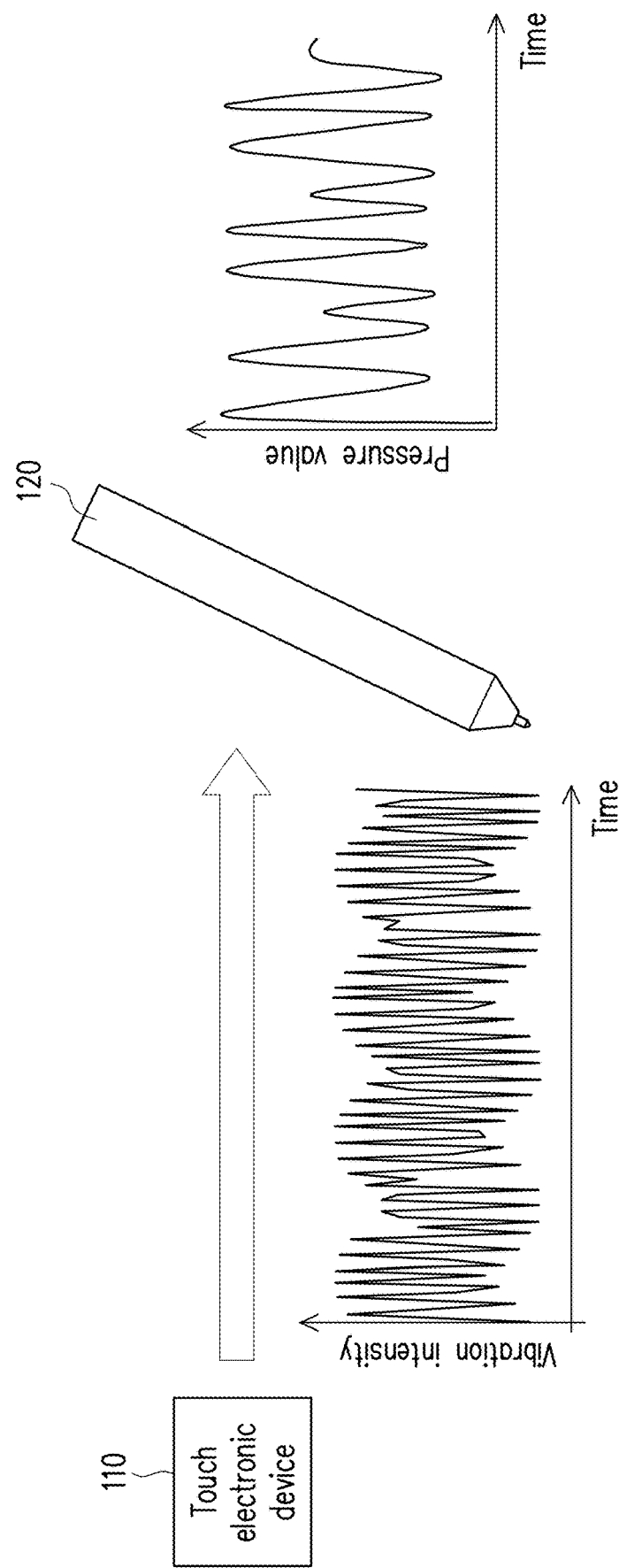
FIG. 3 is a schematic diagram of an operation of a touch system according to an embodiment of the disclosure.

For instance, FIG. 3 is a schematic diagram of an operation of a touch system according to an embodiment of the disclosure. With reference to FIG. 3, in light of the foregoing description, the touch electronic device 110 may output a vibration signal 31 through the touch panel 111. A vibration force of the vibration signal 31 may vary together with time. In response to the pressure of pushing the pen tip 121 toward the inside of the stylus 120 by the vibration signal 31, the pressure sensor 122 may output a pressure sensing result 32 to the controller 123 according to a specific sensing sampling frequency. The specific sensing sampling frequency and the vibration frequency of the vibration signal 31 may be designed according to actual needs. It may be seen that the pressure sensing result 32 reflects the vibration force of the vibration signal 31. Therefore, the controller 123 may decode the transmission information provided by the touch electronic device 110 according to the pressure sensing result 32.

According to an embodiment, note that the touch controller C1 may provide the panel information of the touch panel 111 (such as the communication protocol, specification data, or hardware characteristics supported by the touch panel 111) to the processor 114, and the processor 114 may encode the panel information as the transmission information into the vibration signal V1. In other words, the transmission information may include the panel information of the touch panel 111. Accordingly, the stylus 120 may obtain the panel information of the touch panel 111 through the vibration signal V1 to facilitate other subsequent applications.

In an embodiment, the transmission information may include at least one of a protocol setting command and a frequency setting command. The processor 114 may generate at least one of the protocol setting command and the frequency setting command according to at least one of the driving frequency and the communication protocol of the touch panel 111. Correspondingly, the functions performed by the stylus 120 in response to the transmission information include a function of switching at least one of the communication protocol and the operating frequency of the stylus.

In an embodiment, the transmission information may include the protocol setting command, and functions performed by the stylus 120 according to the transmission information include a function of switching the communication protocol of the stylus 120. Correspondingly, the processor 114 generates the protocol setting command according to the communication protocol supported by the touch panel 111. In detail, the touch electronic device 110 may notify the stylus 120 of the specific communication protocol supported by the touch panel 111 through the vibration signal V1, so that the stylus 120 may switch the communication protocol according to the transmission information carried by the vibration signal V1.

In an embodiment, the transmission information may include the frequency setting command, and functions performed by the stylus 120 according to the transmission information include a function of adjusting the operating frequency of the stylus 120. Correspondingly, the processor 114 generates the frequency setting command according to the driving frequency of the touch panel 111. In detail, the touch electronic device 110 may notify the stylus 120 of the current driving frequency (also known as a touch scan frequency) of the touch panel 111 through the vibration signal V1, so that the stylus 120 may adjust the operating frequency of the stylus 120 according to the transmission information carried by the vibration signal V1. When the driving frequency of the touch panel 111 matches the operating frequency (or referred to as a carrier frequency or a transmission frequency) of the stylus 120, the touch panel 111 may effectively receive the electric signal generated by the signal transmitter 124. Therefore, when the touch panel 111 adjusts the driving frequency in response to noise measurement, the stylus 120 may also be adjusted to be operated at an appropriate operating frequency according to the transmission information.

However, the transmission information is not limited to the panel information provided by the touch controller C1. For instance, in an embodiment, the transmission information may include stroke setting data, and functions performed according to the transmission information include a function of recording the stroke setting data into the storage device 125 of the stylus 120. The stroke setting data may include color, stroke thickness, stroke type, and so on. Specifically, the processor 114, in response to an operation of the user (such as clicking a function key on a software program interface, pressing a physical key on the stylus 120, or the like), generates the stroke setting data according to a current setting state of the stylus 120. The processor 114 may transmit the current stroke setting data to the stylus 120 through the vibration signal V1 to store the preferred stroke settings of the user in the storage device 125 of the stylus 120. As such, it is no longer necessary for the user to perform the stroke setting again whenever the stylus 120 is used, so the user may personalize the settings of the stylus 120 and may also apply the same stroke settings to another touch electronic device.

In an embodiment, the processor 114 may determine the vibration force of the vibration signal V1 with respect to at least one synchronization time point according to the transmission information. Correspondingly, the controller 123 of the stylus 120 may decode the vibration signal V1 according to the vibration force with respect to the synchronization time point to obtain the transmission information. In detail, the touch electronic device 110 and the stylus 120 may perform encoding and decoding operations according to the synchronization time information and the corresponding vibration force after completing the time synchronization procedure. The time synchronization procedure described above may include steps of sending a beacon signal to the stylus 120 by the touch electronic device 110, and feeding a synchronization confirmation signal back to the touch electronic device 110 by the stylus 120.

In the time synchronization procedure, in response to the receipt of the beacon signal by the stylus 120 (the beacon signal is sent by the touch electronic device 110), the controller 123 may send the synchronization confirmation signal through the signal transmitter 124. Correspondingly, the processor 114 of the touch electronic device 110 controls the touch panel 111 to send the beacon signal and receives the synchronization confirmation signal from the stylus 120 through the touch panel 111. Next, the processor 114 may control the touch panel 111 to output the vibration signal V1 after receiving the synchronization confirmation signal, and the controller 123 decodes the vibration signal V1 according to the vibration force to obtain the transmission information after sending the synchronization confirmation signal. The beacon signal may be implemented in form of a wireless radio frequency signal, an electric signal, or a vibration signal. It should be mentioned that the beacon signal provided in an embodiment of the disclosure includes another vibration signal which corresponds to a preset vibration force and is maintained for a preset duration.

Figure 4:
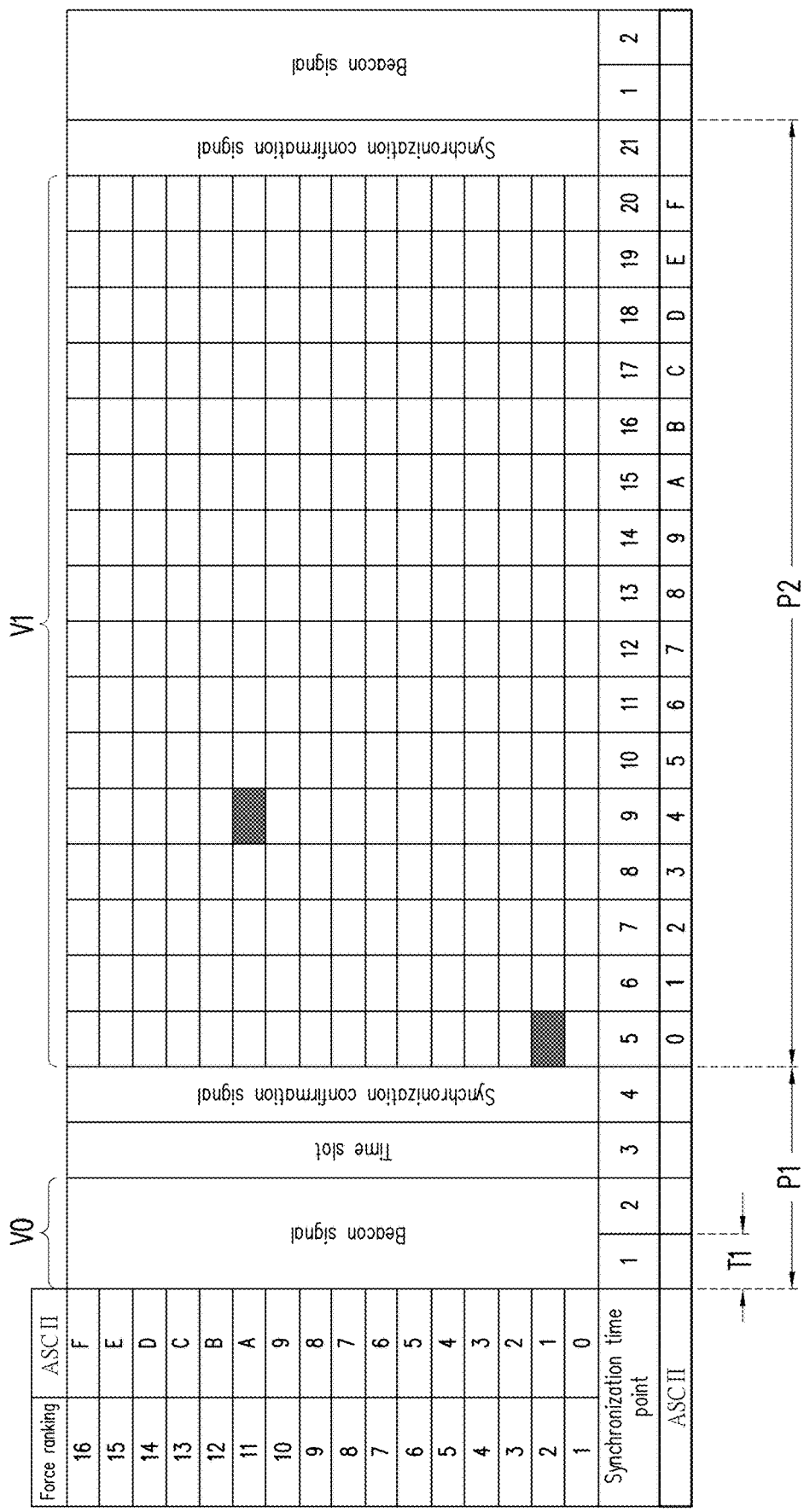
FIG. 4 is a schematic diagram of decoding a vibration signal according to an embodiment of the disclosure.

For instance, FIG. 4 is a schematic diagram of decoding a vibration signal according to an embodiment of the disclosure. Note that the transmission information is in a hexadecimal ASCII format, for instance, which should however not be construed as a limitation in the disclosure. It should be mentioned that the vibration force is divided into 16 force rankings, which should however not be construed as a limitation in the disclosure. The controller 123 may learn the force ranking of the vibration force according to the pressure sensing value reported by the pressure sensor 122. With reference to FIG. 4, when the touch electronic device 110 intends to transmit the transmission information to the stylus 120 through the vibration of the touch panel 111, the touch electronic device 110 and the stylus 120 may execute the time synchronization procedure during a time synchronization period P1 and perform a data transmission process during a data transmission period P2.

During the time synchronization period P1, the touch electronic device 110 controls the haptic actuation device 112 to drive the touch panel 111 to output a vibration signal V0 as a beacon signal. A preset vibration force of the vibration signal V0 has "ranking 16" and is maintained for a preset duration T1 (approximately two synchronization time points). In response to the pressure sensor 122 of the stylus 120 sensing the vibration signal V0, the stylus 120 may determine that the beacon signal is received. However, the preset vibration force and the preset duration T1 of the vibration signal acting as the beacon signal may be designed according to actual needs, which should not be construed as a limitation in the disclosure. Next, the stylus 120 may send the synchronization confirmation signal to the touch electronic device 110 through the signal transmitter 122 at a synchronization time point 4.

After the time synchronization period P1 and during the data transmission period P2, the touch electronic device 110 controls the haptic actuation device 112 to drive the touch panel 111 to output the vibration signal V1 to transmit the transmission information. A first vibration force of the vibration signal V1 at a first synchronization time point 5 is "ranking 2", and a second vibration force at a second synchronization time point 9 is "ranking 11". Therefore, as shown in FIG. 4, it may be learned that the stylus 120 may acquire the hexadecimal value "01" based on the first vibration force of the vibration signal sensed at the first synchronization time point 5 and acquire the hexadecimal value "4A" based on the second vibration force of the vibration signal sensed at the second synchronization time point 9. Thereby, the stylus 120 may perform a command search based on the hexadecimal values "01" and "4A" and decide to execute a specific function. For instance, the stylus 110 may switch to a specific communication protocol or change the operating frequency of the stylus. Table 1 is an exemplary command search table, which should however not be construed as a limitation in the disclosure.

TABLE 1

| Command | Operation |
|---------|-----------|
| 01 | Switch to a first protocol (e.g., MPP) |
| 02 | Switch to a second protocol (e.g., AES) |
| 03 | Switch to a third protocol (e.g., USI) |
| 4A | Frequency hopping to a first operating frequency A |
| 4B | Frequency hopping to a second operating frequency B |
| 4C | Frequency hopping to a third operating frequency C |

Based on the exemplary Table 1, when the stylus 120 decodes the vibration signal V1 and obtains the hexadecimal values "01" and "4A", the stylus 120 switches to the first communication protocol (e.g., MPP) and hops to the first operating frequency A, so as to perform an active pen touch detection together with the touch electronic device 110 in accordance with the same communication protocol, and since the operation is done at the first operating frequency A, noise of the touch panel 111 may be avoided to ensure good touch quality.

Figure 5:
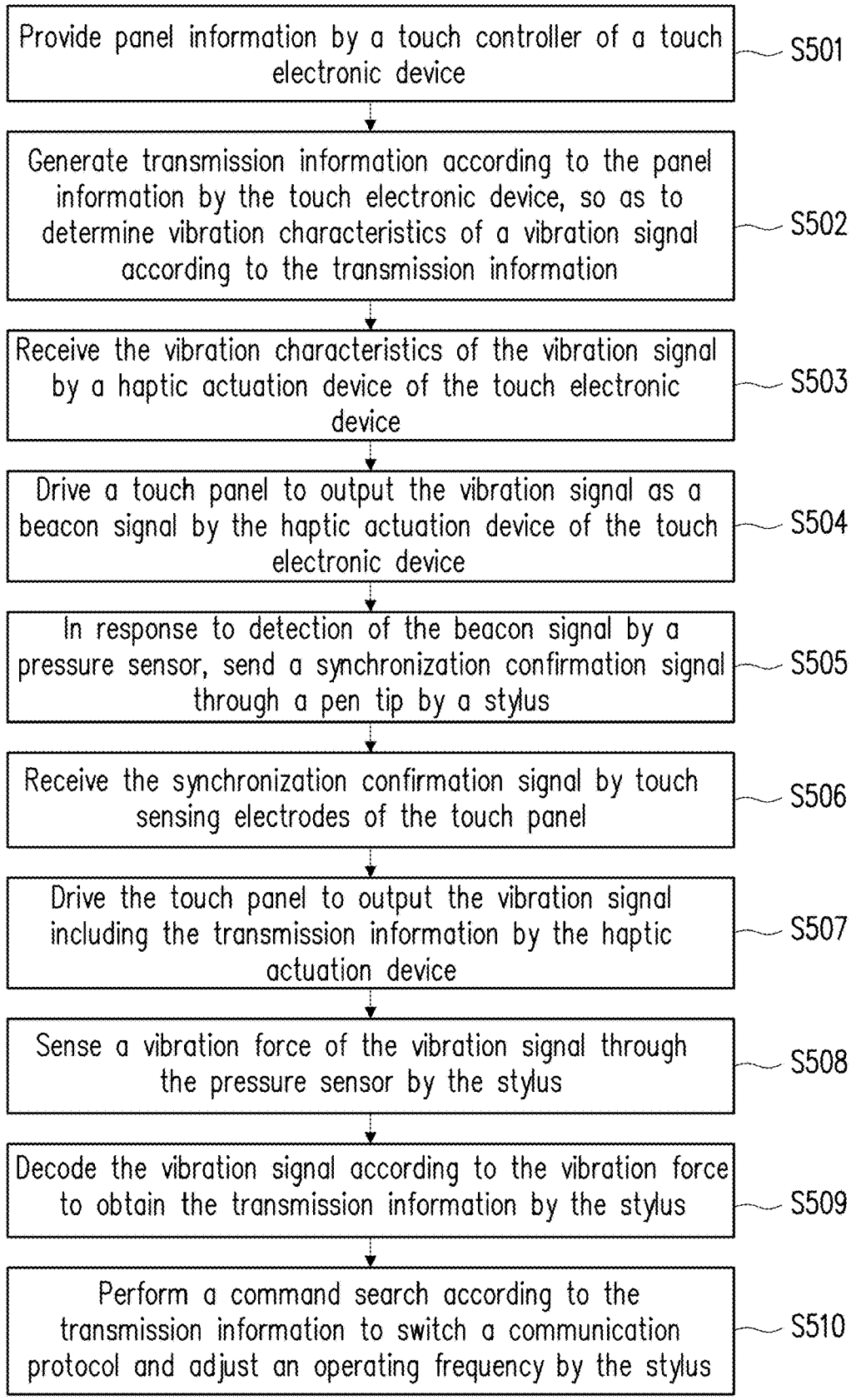
FIG. 5 is a flowchart of pairing a communication signal to a communication protocol according to an embodiment of the disclosure.

FIG. 5 is a flowchart of pairing a communication signal to a communication protocol according to an embodiment of the disclosure. With reference to FIG. 5, a method provided in the embodiment is adapted to the touch system 10 depicted in FIG. 1, and the detailed steps of the method of updating the settings of the stylus are described below with reference to the elements of the touch system 10.

With reference to FIG. 5, in step S501, the touch controller of the touch electronic device 110 provides the panel information to the processor 114 of the touch electronic device 110. The panel information may include the communication protocol and the driving frequency supported by the touch panel 111. In step S502, the processor 114 of the touch electronic device 110 generates the transmission information (i.e., the protocol setting command and the frequency setting command) according to the panel information, so as to determine the vibration characteristics of the vibration signal according to the transmission information. In step S503, the haptic actuation device 112 receives the vibration characteristics of the vibration signal from the processor 114.

In step S504, the haptic actuation device 112 drives the touch panel 111 to output the vibration signal as a beacon signal. In step S505, in response to detection of the beacon signal by the pressure sensor 122, the stylus 120 sends the synchronization confirmation signal through the pen tip 121. In step S506, the touch sensing electrodes of the touch panel 111 receive the synchronization confirmation signal. In step S507, the haptic actuation device 112 drives the touch panel 111 to output the vibration signal including the transmission information (i.e., the protocol setting command and the frequency setting command). In step S508, the stylus 120 senses the vibration force of the vibration signal through the pressure sensor 122. In step S509, the stylus 120 decodes the vibration signal according to the vibration force to obtain the transmission information (i.e., the protocol setting command and the frequency setting command). In step S510, the stylus 120 performs a command search according to the transmission information to switch the communication protocol and adjust the operating frequency.

To sum up, in one or more embodiments of the disclosure, the haptic actuation device drives the touch panel to output the edited vibration signal, and the pressure sensor of the stylus may sense the vibration force by sensing the pressure applied to the pen tip by the vibration signal. The stylus may obtain the transmission information from the touch electronic device according to the sensed pressure corresponding to vibration force. Thereby, the active stylus may transmit information to the stylus through the vibration of the touch panel. Besides, if the transmission information carried by the vibration signal includes the panel information, the stylus may, in response to the receipt of the vibration signal, spontaneously complete the pairing of the communication protocol and adjust the operating frequency of the stylus, which significantly facilitates the use and improves the touch quality.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. A stylus, comprising:
   a pen tip, receiving a vibration signal;
   a pressure sensor, connected to the pen tip and sensing a vibration force of the vibration signal;
   a controller, coupled to the pressure sensor, the controller decoding the vibration signal according to the vibration force with respect to a synchronization time point to obtain transmission information and performing a function according to the transmission information, wherein a pressure value sensed by the pressure sensor is positively correlated to the vibration force of the vibration signal; and
   a signal transmitter coupled to the controller,
   wherein the controller, in response to receiving a beacon signal, sends a synchronization confirmation signal through the signal transmitter, and decodes the vibration signal according to the vibration force after sending the synchronization confirmation signal,
   wherein the beacon signal comprises another vibration signal which corresponds to a preset vibration force and is maintained for a preset duration.

2. The stylus according to claim 1, wherein the transmission information comprises at least one of a protocol setting command and a frequency setting command, and the function comprises a function of switching at least one of a communication protocol and an operating frequency of the stylus.

3. The stylus according to claim 1, further comprising a storage device, wherein the transmission information comprises stroke setting data, and the function comprises a function of recording the stroke setting data into the storage device.

4. A touch electronic device, comprising:
   a touch panel;
   a haptic actuation device, connected to the touch panel;
   a storage device; and
   a processor, coupled to the touch panel, the haptic actuation device, and the storage device,
   wherein the processor encodes transmission information into a vibration signal, determines a vibration force of the vibration signal with respect to at least one synchronization time point according to the transmission information, and controls the haptic actuation device to drive the touch panel to output the vibration signal, so that a stylus obtains the transmission information through receiving the vibration signal, wherein the processor controls the touch panel to output a beacon signal to receive a synchronization confirmation signal from the stylus through the touch panel, wherein the beacon signal comprises another vibration signal which corresponds to a preset vibration force and is maintained for a preset duration.

5. The touch electronic device according to claim 4, wherein the transmission information comprises at least one of a protocol setting command and a frequency setting command, and the processor generates the protocol setting command according to a communication protocol of the touch panel and generates the frequency setting command according to a driving frequency of the touch panel.

6. The touch electronic device according to claim 4, wherein the transmission information comprises stroke setting data, and the processor, in response to an operation of a user, generates the stroke setting data according to a current setting state of the stylus.

7. A touch system, comprising:
a touch electronic device, comprising a touch panel and a haptic actuation device, the haptic actuation device being connected to the touch panel; and
a stylus, comprising a pressure sensor and a pen tip, the pressure sensor being connected to the pen tip,
wherein the touch electronic device encodes transmission information into a vibration signal and controls the haptic actuation device to drive the touch panel to output the vibration signal,
the pen tip of the stylus receives the vibration signal, the pressure sensor senses a vibration force of the vibration signal, the stylus decodes the vibration signal according to the vibration force to obtain the transmission information, and the stylus performs a function according to the transmission information,
wherein the transmission information comprises at least one hexadecimal value, and the stylus performs a command search based on the hexadecimal value to decide to perform the function.

8. The touch system according to claim 7, wherein the stylus decodes the vibration signal according to the vibration force with respect to a synchronization time point to obtain the transmission information, and a pressure value sensed by the pressure sensor is positively correlated to the vibration force of the vibration signal.

9. The touch system according to claim 7, wherein the stylus further comprises a signal transmitter, the stylus, in response to receiving a beacon signal, sends a synchronization confirmation signal through the signal transmitter, and the stylus decodes the vibration signal according to the vibration force after sending the synchronization confirmation signal.

10. The touch system according to claim 9, wherein the beacon signal comprises another vibration signal which corresponds to a preset vibration force and is maintained for a preset duration.

11. The touch system according to claim 9, wherein the touch panel output the beacon signal and then the touch electronic device receives the synchronization confirmation signal from the stylus through the touch panel.

12. The touch system according to claim 7, wherein the transmission information comprises a frequency setting command, and the function comprises a function of switching an operating frequency of the stylus.

13. The touch system according to claim 7, wherein the transmission information comprises a protocol setting command, and the function comprises a function of switching a communication protocol of the stylus.

14. The touch system according to claim 7, wherein the stylus further comprises a storage device, the transmission information comprises stroke setting data, and the function comprises a function of recording the stroke setting data into the storage device.

15. The touch system according to claim 7, wherein the touch electronic device determines the vibration force of the vibration signal with respect to at least one synchronization time point according to the transmission information.

* * * * *